United States Patent
Dawson et al.

(10) Patent No.: US 8,120,790 B2
(45) Date of Patent: Feb. 21, 2012

(54) METHOD AND SYSTEM TO ALLOW PRINTING COMPRESSION OF DOCUMENTS

(75) Inventors: Christopher James Dawson, Arlington, VA (US); Gregory Jensen Boss, American Fork, UT (US); Rick Allen Hamilton, II, Charlottesville, VA (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 12/127,819

(22) Filed: May 28, 2008

(65) Prior Publication Data

US 2008/0225336 A1    Sep. 18, 2008

Related U.S. Application Data

(63) Continuation of application No. 11/337,257, filed on Jan. 20, 2006, now abandoned.

(51) Int. Cl.
*G06F 15/00* (2006.01)

(52) U.S. Cl. .......... 358/1.13; 358/1.2; 358/1.9; 358/2.1; 358/1.12; 358/1.15; 358/1.18; 715/234; 715/255; 715/269; 715/273; 715/810

(58) Field of Classification Search ............. 358/1.13, 358/1.2, 1.9, 2.1, 1.12, 1.15, 1.18; 715/234, 715/255, 269, 273, 810
See application file for complete search history.

(56) References Cited

U.S. PATENT DOCUMENTS

| | | | |
|---|---|---|---|
| 4,068,224 A | 1/1978 | Bechtle et al. | |
| 4,901,248 A | 2/1990 | Ueno et al. | |
| 5,121,468 A * | 6/1992 | Daino | 358/1.2 |
| 5,282,062 A | 1/1994 | Ohara et al. | |
| 5,461,682 A | 10/1995 | Nomura | |
| 6,038,033 A | 3/2000 | Bender et al. | |
| 6,043,802 A * | 3/2000 | Gormish | 345/596 |
| 2001/0038469 A1* | 11/2001 | Saito | 358/518 |
| 2004/0174554 A1 | 9/2004 | Lee et al. | |
| 2005/0035984 A1 | 2/2005 | Walmsley | |
| 2005/0204145 A1* | 9/2005 | Makishima | 713/182 |
| 2005/0262441 A1* | 11/2005 | Yoon | 715/526 |
| 2007/0080971 A1* | 4/2007 | Sung | 345/545 |
| 2007/0124670 A1* | 5/2007 | Finck et al. | 715/526 |

OTHER PUBLICATIONS

Office Action (Mail Date Jun. 17, 2009) for U.S. Appl. No. 11/337,257, filed Jan. 20, 2006, Confirmation No. 4358.

* cited by examiner

*Primary Examiner* — David K Moore
*Assistant Examiner* — Mark Milia
(74) *Attorney, Agent, or Firm* — Schmeiser, Olsen & Watts; Mark Vallone

(57) ABSTRACT

A print compression method and system reduces the amount of space required to print a document such that less paper is used during the printing of a document. A user defines criteria, which is used to perform document compression. However, the document compression only applies to the form of document being printed. This compression does not affect the document being edited.

18 Claims, 7 Drawing Sheets

METHOD AND SYSTEM TO ALLOW PRINTING COMPRESSION OF DOCUMENTS

CROSS-REFERENCE TO RELATED APPLICATIONS

This application is a continuation of the application Ser. No. 11/337,257 filed on Jan. 20, 2006, status abandoned with Noticed of Abandonment mailed Jan. 25, 2010.

FIELD OF THE INVENTION

The present invention relates to a method and system for printing a document on a page and in particular to a method and system that automatically compresses the amount of information that is to be printed on a page in order to reduce the amount of paper needed to print the information.

BACKGROUND OF THE INVENTION

A computer printer is a computer peripheral device that produces a hard copy (permanent human-readable text and/or graphics, usually on paper) from data stored in a computer connected to it. FIG. 1 illustrates a typical computer and printing system. As shown, the personal computer 2 has a display screen 5, a keyboard 6, a coordinate input device (mouse) 7, and a controller body 8. The controller body 8 is connected to the laser printer 3 by a connecting cable 9. Therefore, various image print data generated by the personal computer 2 can be transmitted to the laser printer 3.

The data received by the printer may be: 1) a string of characters, 2) a bitmapped image, or 3) a vector image. The string of characters, in computing terms, plain text is textual material that is usually in an unformatted form. Plain text is represented as files in ASCII text or human-readable form. Each character has a binary code representation. For example, the binary code for a 'carriage return' (CR) is 0000 1101. The binary code for an 'end text' is 0000 1100. The binary code for a 'null character' is 0000 0000.

When a print instruction occurs in the personal computer, the printer driver is started to the conversion of the image data to binary format and to compress the binary data. Then, print data, including language-expressing data by a page-description language, control commands, and the compressed image data are transmitted to the laser printer 3.

A page printer such as a laser printer is capable of performing high-speed printing. Laser printers receive print data, such as text data and image data, from an external device, such as a host computer or a personal computer, and stores the print data as packet data, which includes print information and code data for characters and symbols and print position information for image data. The packet data is developed into bit image data with a printable format and stored in a print image buffer. The developed bit image data for one dot line corresponding to a single raster scan, is sequentially retrieved from the print image buffer and outputted to a print mechanism. The print mechanism then prints the text or image on a print medium such as a sheet of paper.

Much printing that occurs is informal printing in that the document is printed out to review and edit. After the completion of the editing process, the user prints a final version of the document. Many documents have data that is arranged in various ways as desired by the creator of the document. As part of theses arrangements, documents can contain many blank spaces or blank sections. In addition, the font size of the characters will necessitate the need for additional pages to contain the contents of the document. Many of these pages are printed with various amounts of information on them. In some cases, the contents of multiple pages could easily fit onto one page. The printing of document pages containing little content can result in a needless use of paper. To address the problems of wasted paper and time-consuming prints, a manual step prior to printing the document would be to take out the spaces and reduce the size of large fonts. There is no automated algorithm that can preprocess a document prior to printout that will quickly and reliably improve the efficiency of printout. Further, the manual process results in a modification of the actual document that would require changing the document back to the version prior to the compression for printing.

Currently, there is feature in some word processors, which allows a user to identify a selection of text and then also specify the desired number of pages that text should fit in. Taking that information, the word processor then incrementally shaves off point values in the line spacing, font size and margin sizes until it can fit the text into the specified number of pages. However, this feature has limitations in that it only allows very small incremental changes to the printed document. Further, the changes allowed by this function are also forced to be proportional and has a gating factor in the function to only allow a relatively small amount of change to the document before it will fail. The design goal of this feature is to maintain the same exact look and feel of the previous state and all elements of text, kerning, margin, size, line spacing are all changes in proportion to each other. This current feature would not accomplish nearly as much space savings as desired for many applications, but could be only used for documents which must keep the same formatting when printed.

There have been other efforts to reduce or compress data during the printing process. U.S. Pat. No. 5,771,340 (Nakazato, et al.) In the method printing data transmitted from a host computer is stored in a receiving buffer. An editorial unit receives the printing data in the receiving buffer in each one line and writes into a page buffer after compressed. The editorial unit compresses the printing data with plural types of compression techniques and computes compression rates for each line of data. A compression technique to be applied is determined in accordance with the compression rates. The printing data of each line up until those of the preset line X are compressed by the determined compression technique. A determination of the compression technique is repeated in every completion of the printing data processing for the X lines. An expansion unit reads out the printing data in the page buffer and deploys them into a band buffer as a raster data. An engine unit performs printing in accordance with the raster data in the band buffer.

U.S. Pat. No. 5,604,846 (Kadota) In this method in order to improve usage efficiency of a RAM provided in a video controller of a laser printer and to prevent occurrence of print overrun errors, a packet data, which contains character/symbol code data and print position information thereof, is developed into a printable format data on a band basis, which is then compressed and stored in an image data buffer provided in the RAM. The compressed image data is retrieved and decoded to restore the original printable format data. The latter data is stored in a print buffer and then sent to the print mechanism for printing. When the image data buffer does not have sufficient memory space for storing subsequent one band's worth of the packet data in compressed form, the data which has already been processed is erased to secure free area of the image data buffer. Alternatively, resolution of the printable format data stored in the image data buffer in compressed form is reduced to secure free memory space in the image data buffer.

U.S. Pat. No. 6,166,824 (Kadota) This invention describes a print data processing apparatus and an input data generating apparatus, in which image data of an original image generated by a personal computer is converted to binary in a selected binary mode. The designation number Dn of the selected binary mode is transmitted with the binary image data to a laser printer. In the laser printer, a data thinning mode-designating number Pn corresponding to the designation number Dn received is set. If the capacity of a development buffer is insufficient, the mode-designating number Pn is read and identified. If Pn="X1", thinning is performed in a first data thinning mode. If Pn="Y2", thinning is performed in a second data thinning mode. If Pn="Z3", thinning is performed in a third data thinning mode. Therefore, if the capacity of a storage device for storing dot image data to be supplied for printing becomes insufficient, dot image data can be reduced in size in an optimal irreversible compressing device selected in accordance with the type of original image.

Although these techniques address the compression of information in regard to the printing process, these approaches focus on the storing of information in the printer prior to the actual printing operation. These solutions do not address the problems with printing documents such that the amount of paper needed for printing is optimized.

With regard to optimizing the paper on which a document is printed, the drawbacks of the known solutions are that they require a manual step for a person to physically modify a document prior to printing. This takes valuable time and results in the original document being modified. Consider that a person modifies a document to reduce the amount of paper the printout will consume. After printing, the person must either undo the changes or save the new 'compressed-for-printing' document under a different name.

There remains a need for a method and system that provides dynamic analysis and compression of the contents and arrangement of a document before the printer prints the document. This analysis and compression should also occur without the need for manual steps and without the need to re-save the document.

SUMMARY OF THE INVENTION

It is an objective of the present invention to provide a method and system that optimizes the amount of paper needed to print a document.

It is a second objective of the present invention to provide a method and system that automatically reduces the amount of print space needed to print out a document.

It is a third objective of the present invention to provide a method that reformats a document during the printing process such that the document requires less material for printing.

It is a fourth objective of the present invention to provide a method that can automatically modify the font size of characters in a document in order to reduce the amount of space needed to print that document.

The core idea of the invention surrounds a dynamic 'preprinting' process to be applied to a document such that when the document is printed, it does not need to keep the same formatting as the source document. Consider the example of a person printing a contract for delivery to a customer, the person is very concerned about format and size of characters. The printed document must match exactly the document created in the word processor. In contrast, consider the example of printing forms or reports as a draft copy or for personal consumption, the person now may not care about such formatting. By utilizing this method of printout compression, the person is able to print out such draft views with less paper and in less time.

In the method of the invention, the user can open a document via some word processing program. The user can then select the print option for printing the document. At this point, the print page could display a printer compression option in the form of an icon. When the user presses this option, the user would then supply print criteria. At this point, the method would search the document and perform reformatting tasks as defined by the print criteria. For example, there may a rule that says: replace [space] [space] with [space]. This operation would replace a double space with a single space. Other criteria could be to reduce the number of carriage returns or reduce the line spacing from double space to single space. At the completion of this reformatting process, the new document is printed. The intent is that the reductions in space will reduce the amount of paper needed to print the document.

DETAILED DESCRIPTION OF THE INVENTION

The present invention provides automated method to reduce the amount of paper required to print certain documents. In application, the method of the invention scans through a document and modifies the document by removing unnecessary space (white space) on the document in accordance to predefined criteria for the document. The modified document is then printed using less paper. The following example shows how the invention can be applied. A person wants to print a 30-page document containing a scripting language source code listing. Upon printing the 30-page document, it is apparent that most of the white space could be eliminated. Additionally the comments could also be removed. The invention adds the preprinting functionality to reduce this amount of white space such that the entire printout is now only 10 pages. To access this function, a person would be presented with options during the printout function to allow such a compressed printout. Configuration changes to the document such including "Use minimum amount of paper as possible" or "Remove unneeded blank pages" or "Remove all embedded white space," etcetera, can be applied prior to printing.

Figure 1:
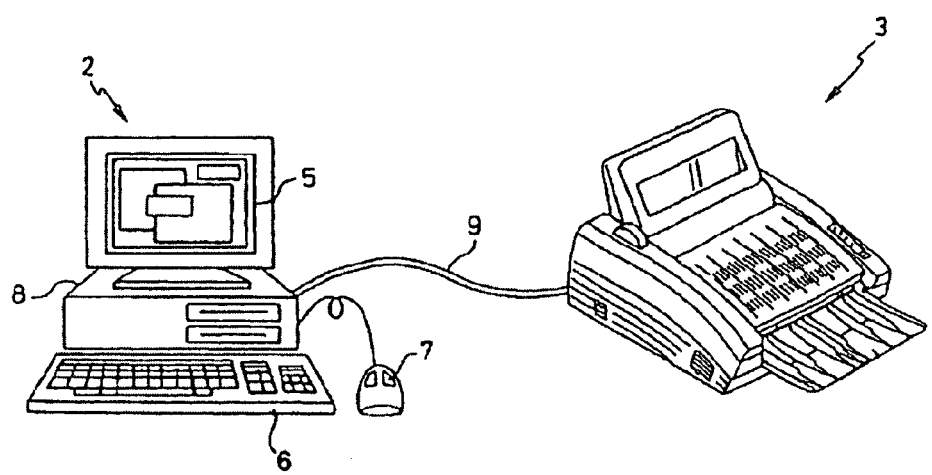
FIG. 1. illustrates a conventional configuration of a computer and printer system.
Figure 2:
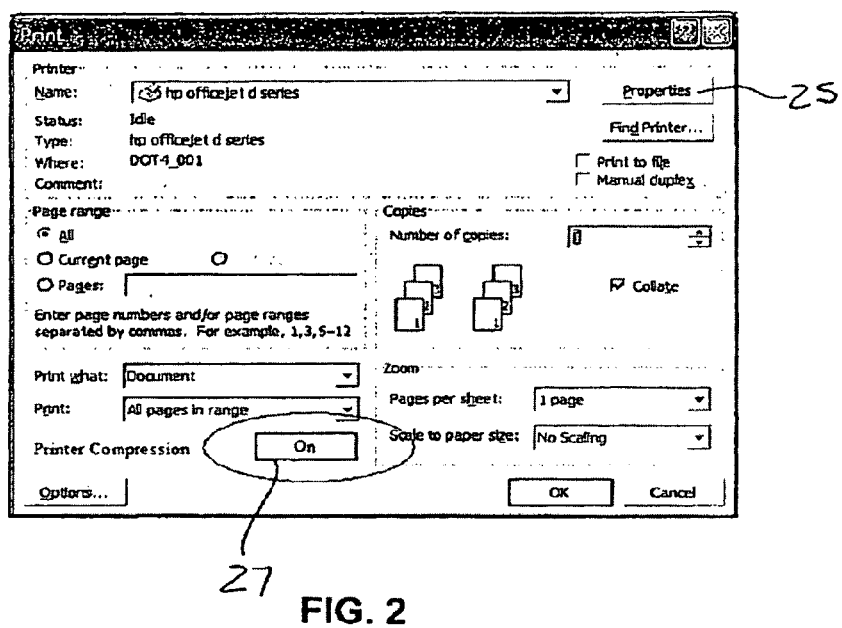
FIG. 2. illustrates a print display screen having various options for printing a document.

FIG. 2. illustrates a print display screen having various options for printing a document. This display is a typical print option screen for printing a document from a word processor. As shown, the screen contains fields associated with printing a document, which includes the name of the printer, the number pages, the number of copies, the cancel icon and the print/OK icon to initiate the printing process. Some of the icons take the user to additional screens where the user can further define how to print the document. One such icon is the 'Properties' icon 25. In the present invention, the print page will contain additional 'Print Compression' icon 27. This icon enables the user to define the criteria for a print compression of the identified document that the user desires to print.

Figure 3:
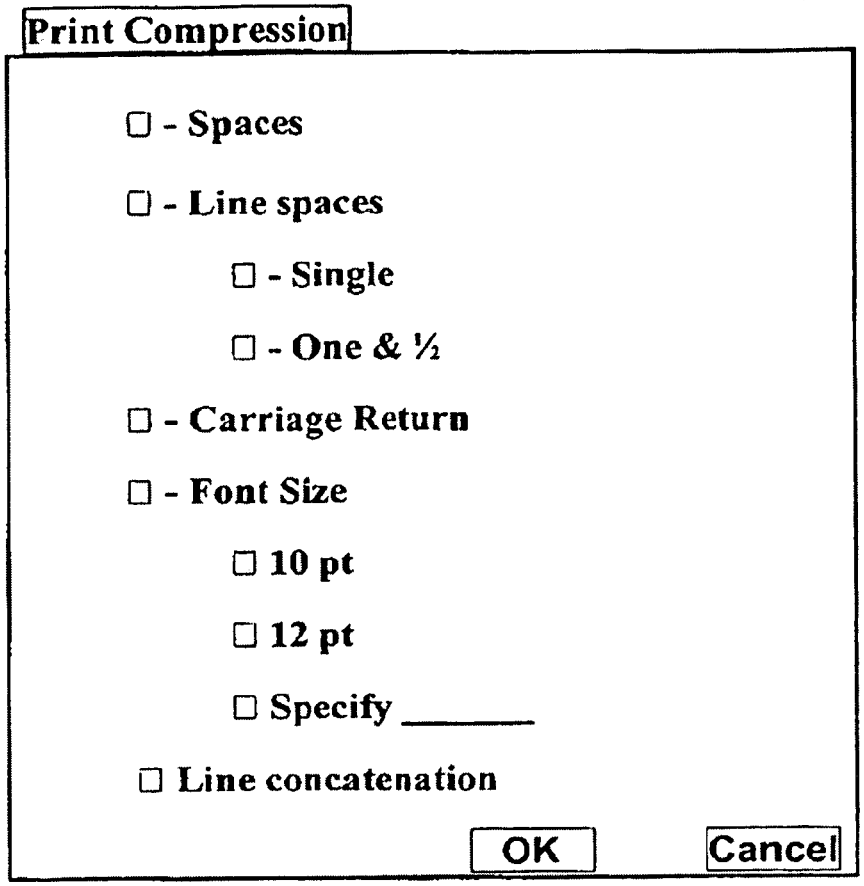
FIG. 3. illustrates a print compression display page having various print compression options.

FIG. 3. illustrates a page in which the user can define specific print compression criteria. Upon the user clicking the 'Printer Compression' icon 27, the print compression display shown in FIG. 3. could appear on the user's screen. As shown, this screen has several print compression parameters that a user can select. The user could click the box next to any criteria the user desires. For example, if the user clicked spaces, carriage returns, line concatenation and font size 12 point, the method of the invention would use these criteria to print the document. Clicking these icons would enact routines that function according to rules for each type of compression.

Figure 4:
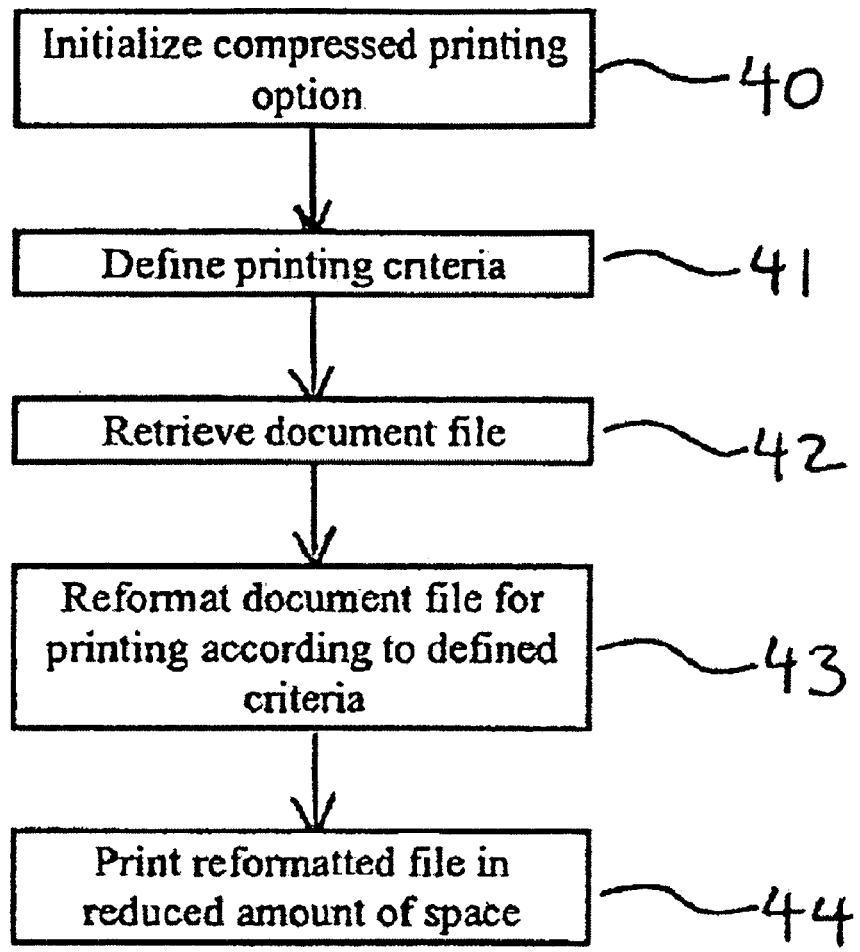
FIG. 4. is a general flow diagram of the steps in the implementation of the present invention.

FIG. 4. is a general flow diagram of the steps in the implementation of the present invention. The first step 40 is to initialize the printing compression option. This initialization occurs when the user clicks the 'Printer Compression' icon 27. As mentioned, once the user clicks the Printer Compression icon, the printer compression display of FIG. 3. appears. At this point, the user can define the print compression parameters in step 41. The user can return to the main print display and initiate the printing process. During this process, step 42 retrieves the identified document to be printed. Step 43 performs the reformatting of the document according to the defined print compression criteria. After the reformatting of the file to the compressed format, step 44 prints the document in the compressed form.

Figure 5:
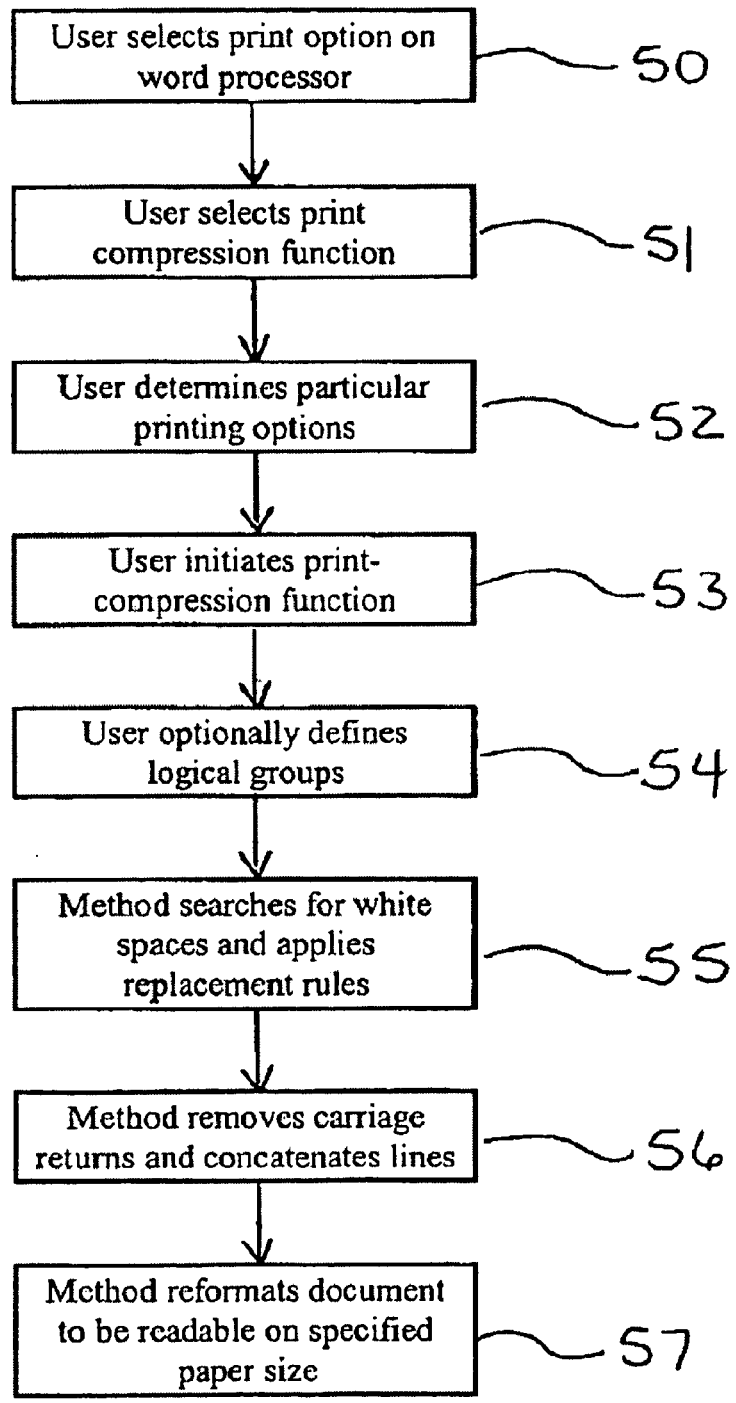
FIG. 5. is a flow diagram of the interaction between a user and the method of the present invention.

FIG. 5. is a flow diagram of the interaction between a user and the method of the present invention. In step 50, a user selects a print option for a document in a conventional manner. The user then selects the print compression option from the print display in step 51. The print compression selection display of FIG. 3. gives the user many options, which can include whether or not graphics needs to be printed and whether the typeface of all fonts should be reduced in size. The user defines the print compression criteria in step 52. The user initiates the print compression option, step 53, by click the 'OK' icon on the printer compression display. In step 54, the method optionally allows for the user to define logical group identifiers by specifying a start and end character key map. The key map may look similar to the following:

Major Group Characters: Start=[End=]
Minor Group Characters: Start={End=}

This provides better printing compression techniques by allowing the algorithm to analyze certain groups of characters. In a document of Java code the {and} key characters would help keep logical groups of code on the same compressed line. In a spreadsheet the keying characters may be "Item" and "Total" which will maintain the document's readability.

Step 55 applies a specific routine for compressing white space in the document. The routine first searches for white space (consecutive blank spaces) and applies a space compression rule such the below illustrated rule. For the spacing routine, the rule could be: TABLE-US-00001 Replace this With this [space] [space] [space]

In step 56, the method removes multiple carriage returns and concatenates lines, which are less than one-half page wide. For the Carriage return routine, the rule could be: TABLE-US-00002 Replace this With this <CR><CR><CR>

For the line concatenation routine, the rule could be: TABLE-US-00003 Replace this With this <Less than ½ lin2><CR><characters><SPACE>

In step 57, the method reformats fonts to be readable on the paper size specified. This function involves, for example, changing a 24 pt. bold header to a 12 pt 'normal' non-bold text.

For the Font Size 12 routine, the rule could be: TABLE-US-00004 Replace this With this 24 pt 12 pt.

In an example of the below listed document content, the algorithm (routine) first replaces all the multiple spaces with a single space. TABLE-US-00005 value value value value value value value value value value value value value value value value value value value value value value value value value value value value value As a result, the document then looks like this: TABLE-US-00006 value value value value value value value value value value value value value value value value value value value value value value value value The algorithm then looks for carriage returns, which appear well before the end of the line. If the user has a document which contains [0040] value [0041] value [0042] value [0043] value [0044] value [0045] value [0046] value [0047] value [0048] value [0049] value The invention analyzes these carriage return new lines, compressing them down to single spaces. From a pre "amount of data" point of view, the new line takes up the same storage space as any other character, but it obviously causes more paper to be wastes upon printout. Again, with this treatment, the document then looks like: TABLE-US-00007 value value value value value value value value value value value value value value value value value Next, the algorithm looks at the sizes of characters in the document and reduces these fonts to the defined font (12 pt). If the font size is already smaller, that font size would remain the same. In an alternate approach if no font size is specified, the algorithm can look at the sizes of characters in the document to determine if the fonts can be reduced in size whilst still being readable. If the document contains: Hello, this is Chris Now we have some smaller text here, but all I care about is that I can read it . . . blah . . . blah . . . blah . . . . The invention analyzes the font sizes and type in the document and takes into account the size of the paper that the document is to be printed on. Each font that can be reduced while still readable when printed on the selected paper size is modified. Again, with this treatment, the document looks like:

Hello, this is Chris. Now we have some smaller text here, but all I care about is that I can read it . . . blah . . . blah . . . blah . . .

If there are no shorten lines, the line concatenation criteria would not apply in this particular document. Taking these three compression techniques into account, a script which looks like: TABLE-US-00008 while (1) {blah_blah echo ("Hello World!") endblah_blah} Will end up looking like: while (1) {blah_blah echo ("Hello World!") endblah_blah}

Figure 6:
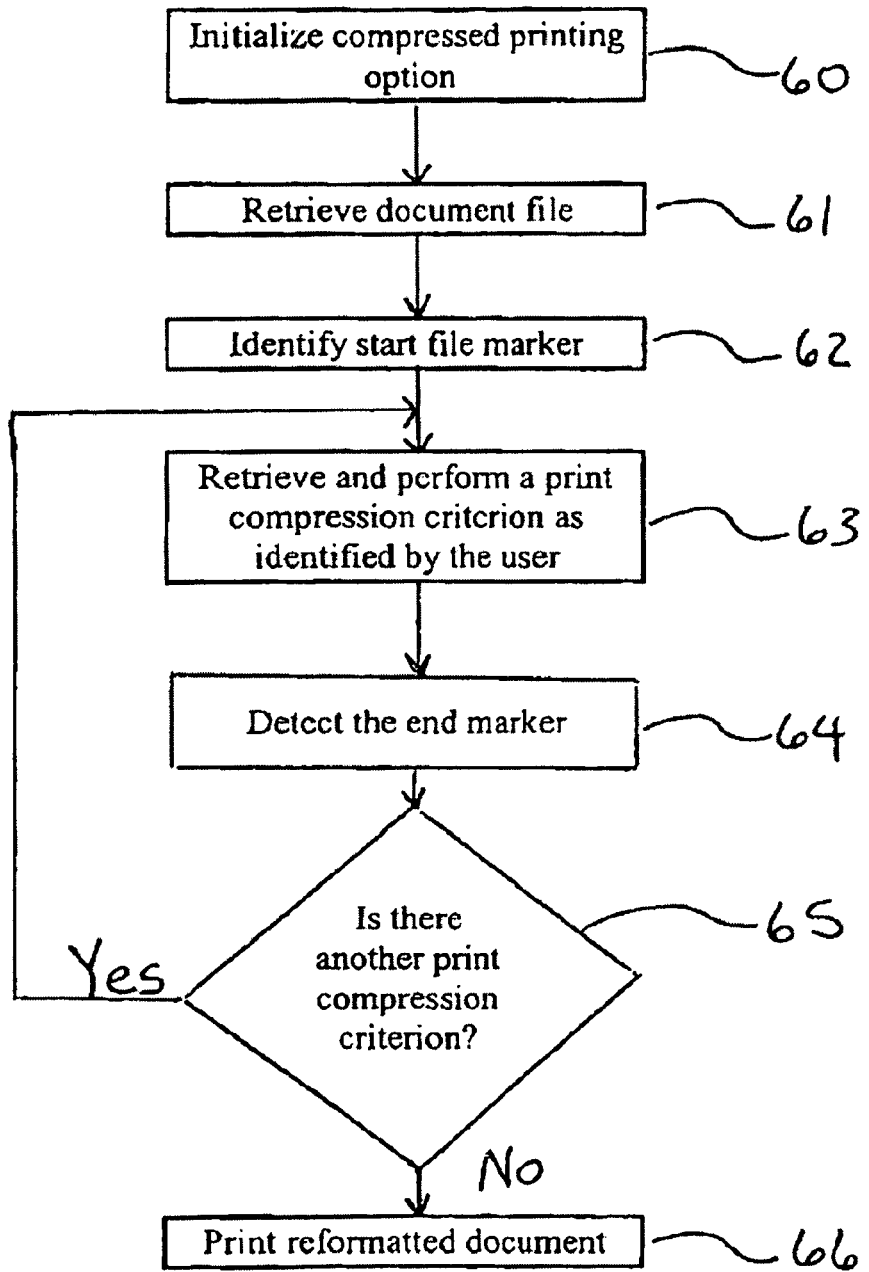
FIG. 6. is a detailed flow diagram of the steps in the implementation of the present invention.

In some applications, a user may only want to compress a portion of the document. FIG. 6. is a detailed flow diagram in which the user designates a portion of the document to compress during the printing process. In step 60, the print compression process option is implemented by receipt of a print compression command. As part of this step 60, the method also receives information about the print compression criteria. The start marker identifying the beginning of the section to be compressed and the end marker identifying the end marker of the section are designed in as part of these criteria. After receipt of the print compression criteria, step 61 retrieves the file of the document to be printed. Step 62 identifies the start marker and end markers and moves to the location of the start marker. Step 63 retrieves and performs a print compression criterion. This criterion is performed until the detection of the end marker in step 64. Step 65 determines if there is another print compression criterion to perform. If there is another criterion, the process moves to step 63 and repeats steps 63, 64 and 65 for that criterion. If there are no more print compression criteria to perform, the method prints the reformatted document in step 66.

In addition to text material, many documents have graphics and pictures in the documents. To compress these documents, there has to be a determination of the treatment of the pictures or graphics. Options could be to remove a picture from the printed document, relocate a picture to another location in the document or to reduce the size of a picture at its current document location.

Figure 7:
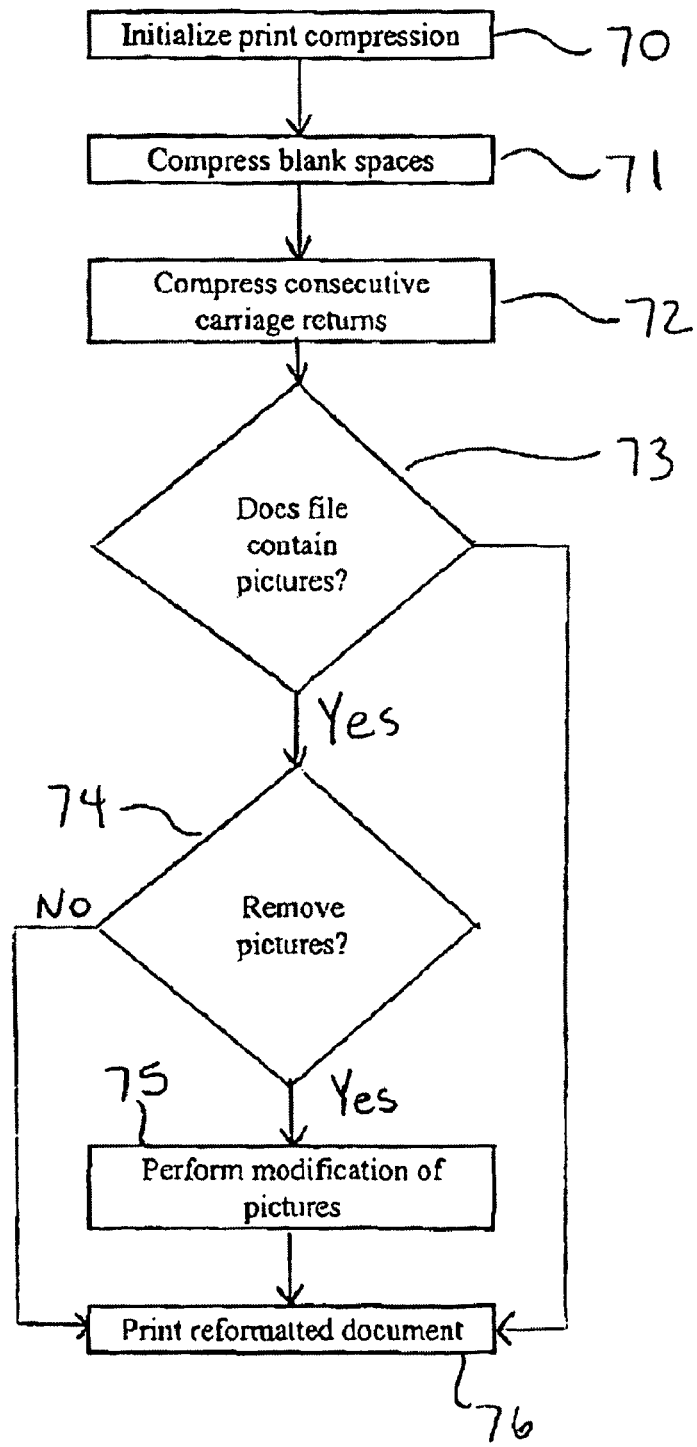
FIG. 7. is flow diagram of the implementation of specific reformatting criteria in accordance with present invention.

FIG. 7. is flow diagram of the implementation of specific print compression criteria considering documents that have pictures. Step 70 is the initialization step and can include (for purpose of explanation) the steps of identifying the print compression criteria as described in FIG. 6. Step 71 compresses the blank spaces in the document. Step 72 can compress the carriage returns in the document. At the completion of the designated print compression criteria, step 73 makes a determination of whether the document contains a picture. This determination may be based on picture identifiers in the file. These identifiers may be inherent in the file and may not require the user to specifically designate them. If there are pictures, the determination is made in step 74 of whether to remove the picture(s), modify the picture size or relocate the picture. Relocation of the picture could be to place the pictures at the end of the document. The user can also designate if they want to print the pictures as part of the compressed document file. Step 75 performs the defined criteria on the picture(s). Next, the document is printed in compressed format in step 76.

The advantages of the present invention provide an important feature that will allow users to more efficiently print documents. Some of the advantages over the known solutions are therefore: [0057] 1) The time taken to print a document for draft or personal consumption is reduced; [0058] 2) The amount of paper needed to print the full document is reduced; [0059] 3) There is no manual step for a user to have to modify the document prior to printing. The invention automates the process dynamically; 4) The amount of ink used to print the entire document is reduced. It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

The invention claimed is:

1. A method of compressing space in a document format for printing a document without affecting the original document format of the document, said method comprising:

presenting, by a computer to a user, a print display screen that comprises fields for controlling said printing the document, said document comprising text characters configured to appear in a printed document that results from said printing the document, said fields comprising a print compression icon which when selected triggers presentation of a print compression display comprising print compression parameters configured to be selected by the user for controlling print compression of the document, wherein the print compression parameters in the print compression display comprise a spaces parameter, a line spacing parameter, a carriage return parameter, a font size parameter, and a line concatenation parameter;

said computer receiving a selection by the user of the print compression icon;

responsive to said receiving the selection of the print compression icon, said computer presenting the print compression display to the user;

said computer receiving a selection by the user of print compression criteria consisting of a subset of the print compression parameters in the print compression display;

said computer retrieving the document for printing;

said computer reformatting the retrieved document by automatically compressing the retrieved document by selectively applying the selected print compression criteria to the document, wherein said automatically compressing comprises utilizing each compression parameter independently and directly to control a size or spatial location of a subset of the text characters in the printed document; and said computer printing the reformatted retrieved document in a space that is less space than the document in its original document format, said printing the reformatted retrieved document resulting in the printed document.

2. The method of claim 1, wherein the selected print compression criteria comprise concatenating all and only original lines in the document which are less than one-half page wide.

3. The method of claim 1, wherein the text characters comprised by the document comprise first characters whose font size is greater than a defined font size and comprise second characters whose font size is less than the defined font size, and wherein the selected print compression criteria comprise a print compression parameter in the print compression display for reducing the font size of the first characters in the document to the defined font size and leaving intact the font size of the second characters in the document.

4. The method of claim 1, wherein the document consists of program code, wherein the method comprises defining a plurality of logical groups of code of said program code, and wherein the selected print compression criteria comprise a print compression parameter in the print compression display for keeping logical groups of code of the plurality of logical groups of code on a same compressed printed line of the printed portion of the document.

5. The method of claim 1, wherein the print compression display consists of said print compression parameters configured to be selected by the user for controlling print compression of the document.

6. The method of claim 1, wherein the print compression parameters in the print compression display consist of the spaces parameter, the line spacing parameter, the carriage return parameter, the font size parameter, and the line concatenation parameter.

7. A computer program product, comprising a computer readable storage device having program instructions stored therein, said program instructions configured to be executed by a computer to implement a method of compressing space in a document format for printing a document without affecting the original document format of the document, said method comprising:

said computer presenting to a user a print display screen that comprises fields for controlling said printing the document, said document comprising information configured to appear in a printed document that results from said printing the document, said fields comprising a print compression icon which when selected triggers presentation of a print compression display comprising print compression parameters configured to be selected by the user for controlling print compression of the document, wherein the print compression parameters in the print compression display comprise a spaces parameter, a line spacing parameter, a carriage return parameter, a font size parameter, and a line concatenation parameter;

said computer receiving a selection by the user of the print compression icon;

responsive to said receiving the selection of the print compression icon, said computer presenting the print compression display to the user;

said computer receiving a selection by the user of print compression criteria consisting of a subset of the print compression parameters in the print compression display;

said computer retrieving the document for printing;

said computer reformatting the retrieved document by automatically compressing the retrieved document by selectively applying the selected print compression criteria to the document, wherein said automatically compressing comprises utilizing each compression parameter independently and directly to control a size or spatial location of a subset of the text characters in the printed document; and said computer printing the reformatted retrieved document in a space that is less space than the document in its original document format, said printing the reformatted retrieved document resulting in the printed document.

8. The computer program product of claim 7, wherein the selected print compression criteria comprise concatenating all and only original lines in the document which are less than one-half page wide.

9. The computer program product of claim 7, wherein the text characters comprised by the document comprise first characters whose font size is greater than a defined font size and comprise second characters whose font size is less than the defined font size, and wherein the selected print compression criteria comprise a print compression parameter in the print compression display for reducing the font size of the first characters in the document to the defined font size and leaving intact the font size of the second characters in the document.

10. The computer program product of claim 7, wherein the document consists of program code, wherein the method comprises defining a plurality of logical groups of code of said program code, and wherein the selected print compression criteria comprise a print compression parameter in the print compression display for keeping logical groups of code of the plurality of logical groups of code on a same compressed printed line of the printed portion of the document.

11. The computer program product of claim 7, wherein the print compression display consists of said print compression parameters configured to be selected by the user for controlling print compression of the document.

12. The computer program product of claim 7, wherein the print compression parameters in the print compression display consist of the spaces parameter, the line spacing parameter, the carriage return parameter, the font size parameter, and the line concatenation parameter.

13. A system, comprising a computer, said computer comprising a computer readable storage device containing instructions configured to be executed by the computer to implement a method of compressing space in a document format for printing a document without affecting the original document format of the document, said method comprising:

said computer presenting to a user a print display screen that comprises fields for controlling said printing the document, said document comprising information configured to appear in a printed document that results from said printing the document, said fields comprising a print compression icon which when selected triggers presentation of a print compression display comprising print compression parameters configured to be selected by the user for controlling print compression of the document, wherein the print compression parameters in the print compression display comprise a spaces parameter, a line spacing parameter, a carriage return parameter, a font size parameter, and a line concatenation parameter;

said computer receiving a selection by the user of the print compression icon;

responsive to said receiving the selection of the print compression icon, said computer presenting the print compression display to the user;

said computer receiving a selection by the user of print compression criteria consisting of a subset of the print compression parameters in the print compression display;

said computer retrieving the document for printing;

said computer reformatting the retrieved document by automatically compressing the retrieved document by selectively applying the selected print compression criteria to the document, wherein said automatically compressing comprises utilizing each compression parameter independently and directly to control a size or spatial location of a subset of the text characters in the printed document; and said computer printing the reformatted retrieved document in a space that is less space than the document in its original document format, said printing the reformatted retrieved document resulting in the printed document.

14. The system of claim 13, wherein the selected print compression criteria comprise concatenating all and only original lines in the document which are less than one-half page wide.

15. The system of claim 13, wherein the text characters comprised by the document comprise first characters whose font size is greater than a defined font size and comprise second characters whose font size is less than the defined font size, and wherein the selected print compression criteria comprise a print compression parameter in the print compression display for reducing the font size of the first characters in the document to the defined font size and leaving intact the font size of the second characters in the document.

16. The system of claim 13, wherein the document consists of program code, wherein the method comprises defining a plurality of logical groups of code of said program code, and wherein the selected print compression criteria comprise a print compression parameter in the print compression display for keeping logical groups of code of the plurality of logical groups of code on a same compressed printed line of the printed portion of the document.

17. The system of claim 13, wherein the print compression display consists of said print compression parameters configured to be selected by the user for controlling print compression of the document.

18. The system of claim 13, wherein the print compression parameters in the print compression display consist of the spaces parameter, the line spacing parameter, the carriage return parameter, the font size parameter, and the line concatenation parameter.

\* \* \* \* \*